Aug. 11, 1964   W. STELZER   3,143,926
BOOSTER BRAKE MECHANISM
Filed Oct. 7, 1960   2 Sheets-Sheet 1
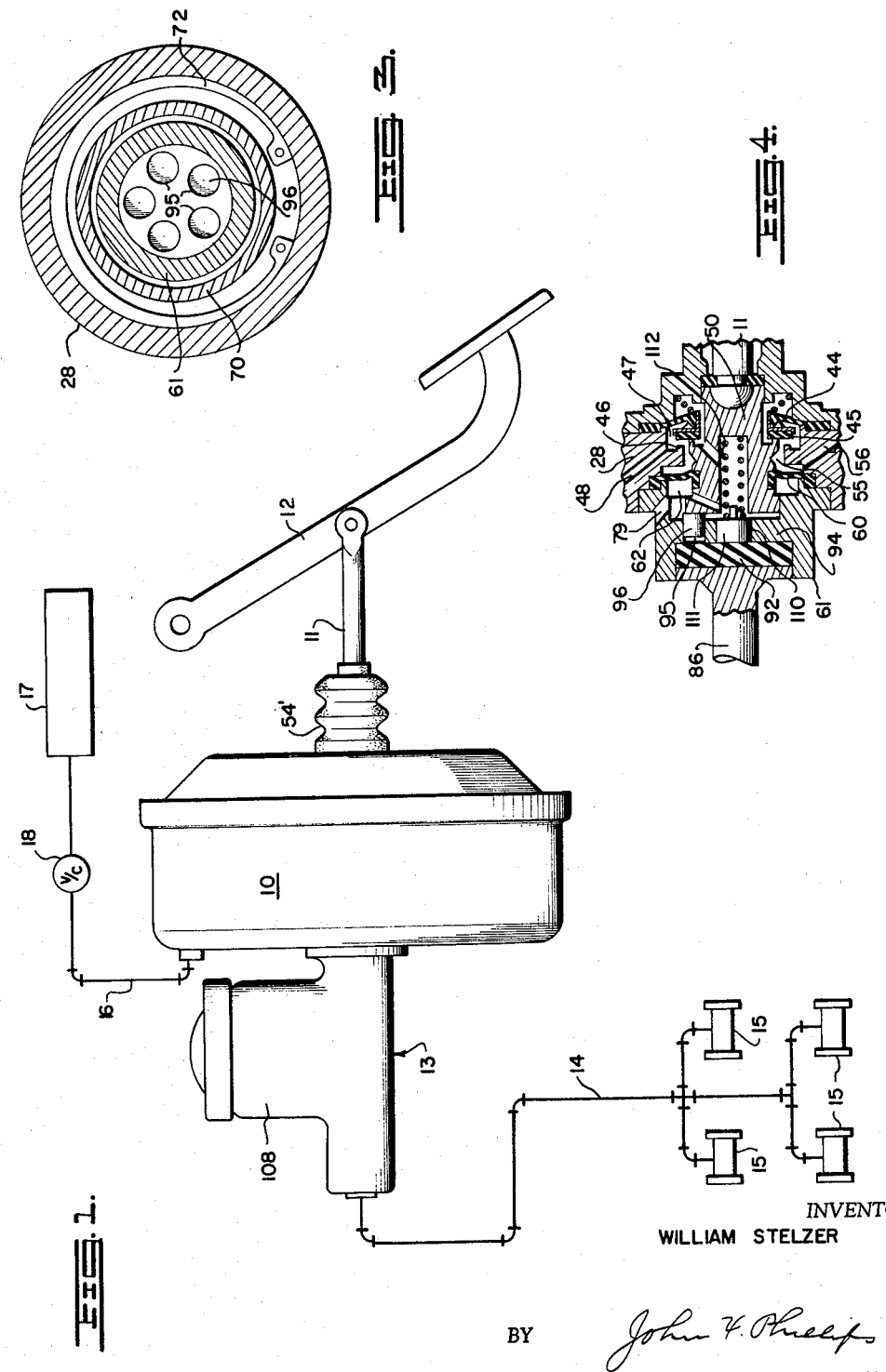
INVENTOR
WILLIAM STELZER
BY John V. Phillips
ATTORNEY

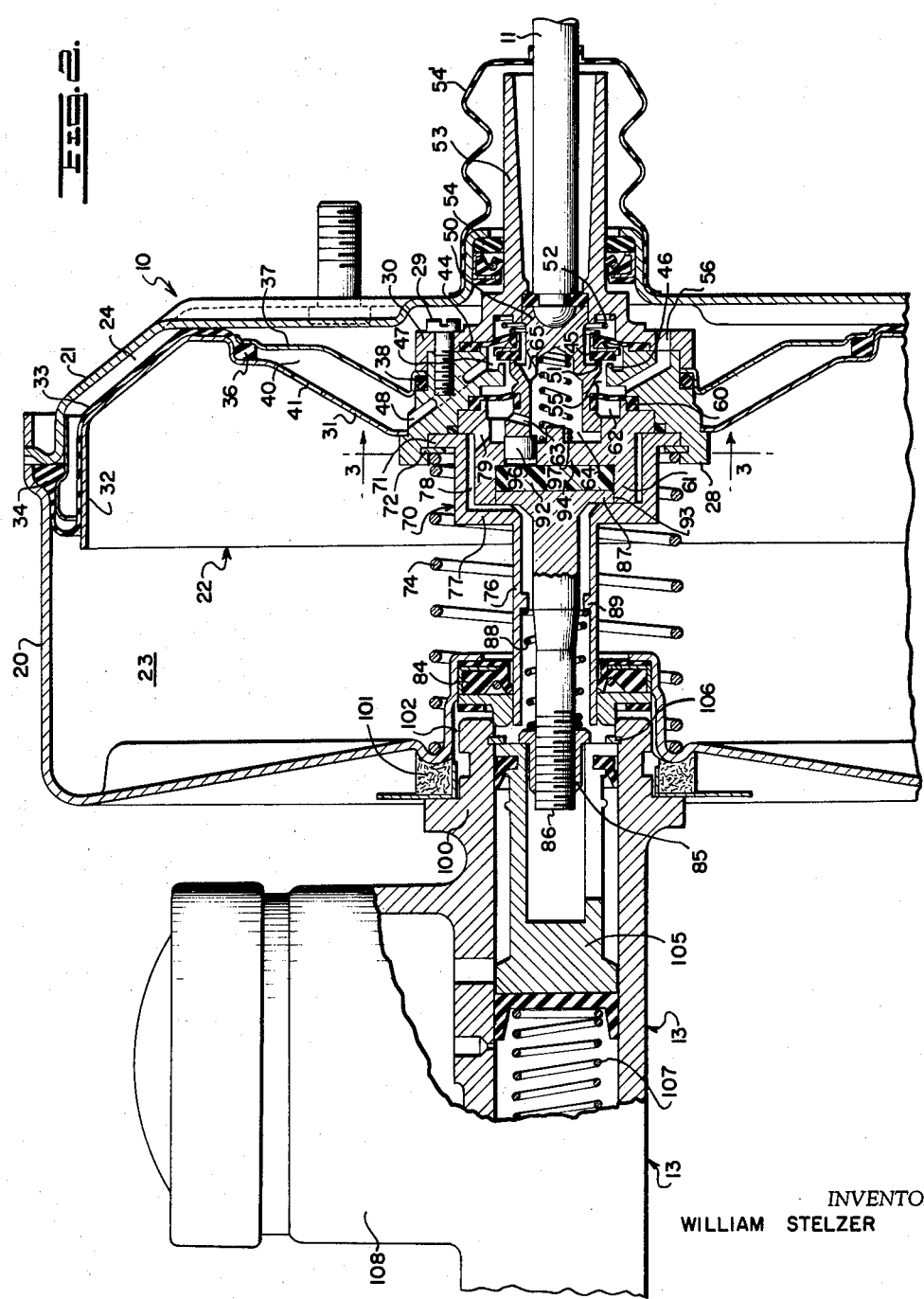

United States Patent Office 3,143,926
Patented Aug. 11, 1964

3,143,926
BOOSTER BRAKE MECHANISM
William Stelzer, Bloomfield Hills, Mich., assignor to Kelsey-Hayes Company, Detroit, Mich., a corporation of Delaware
Filed Oct. 7, 1960, Ser. No. 61,220
10 Claims. (Cl. 91—369)

This invention relates to a booster brake mechanism and has particular reference to a novel type of booster motor for use in a hydraulic brake system.

It has been proposed to use a deformable rubber or similar body subject to deformation upon operation of a vehicle brake pedal to energize a booster motor, to serve as a reaction element for reacting against the brake pedal in accordance with the internal pressure of the rubber body which, in turn, will be proportional to the degree of energization of the booster motor and hence proportional to the degree of brake application. These rubber or other deformable bodies have been engageable by axial or annular surfaces of substantial area formed on a part of the manually operable portion of the motor. The arrangement of parts was such that deformability of the rubber through appreciable distances was required, thus limiting the usable deformability of the rubber. Moreover, the concentricity of the rubber deforming means sometimes had a tendency to cause the manually operable portion of the unit to bind somewhat in operation.

An important object of the present invention is to utilize a new combination of a deformable reaction element and means for deforming such element upon operation of the manually operable portion of the motor, the improved type of deforming means being in the shape of elements movable independently of the manually operable part of the mechanism, thus eliminating any binding operation between the parts.

A further object is to provide a novel type of rubber deforming elements in the combination referred to so that the rubber is deformable in initial stages of motor energization through shorter distances and thus more readily deformable to offer the least internal resistance and thereby render the control mechanism somewhat more sensitive so as to produce a better follow-up of the power relative to the manual force exerted by the operator.

A further object is to provide such a mechanism wherein the generation of substantial internal resistance in the rubber body is delayed until the second stage of booster motor operation occurring incident to initial engagement of the brake shoes with the drums.

A further object is to provide a force transmitting member between the rubber body and the master cylinder plunger, which member is movable to place the rubber body under compression, and to employ in conjunction with the force transmitting member a reaction retarding spring which serves to transmit motor forces to the master cylinder plunger in the earlier stages of brake operation, such spring being stronger than the master cylinder plunger return spring and being compressible by higher pressures in the master cylinder so that the force transmitting member moves to place the rubber body under compression and to reduce its deformability.

A further object is to provide novel spring means for transmitting power from the pressure responsive unit of the motor to the member to be operated during initial energization of the motor, and to provide a novel structure, operable when predetermined resistance to movement of the member to be operated occurs so that the force transmitting spring is compressed, to transmit to the member to be operated forces from the pressure responsive unit and from the manually operable means which operates the valve mechanism for the motor.

A further object is to provide a structure of the character referred to wherein the means operable after the force transmitting spring yields for transmitting forces to the member to be operated comprises a novel type of deformable reaction means for reacting against the manually operable valve operating member to a degree proportional to energization of the motor.

Other objects and advantages of the present invention will become apparent during the course of the following description.

In the drawings I have shown two embodiments of the invention. In this showing:

FIGURE 1 is a side elevation of the booster motor and associated elements, parts of the system being diagrammatically shown;

FIGURE 2 is an enlarged axial sectional view through the booster motor, parts being shown in elevation;

FIGURE 3 is a section on line 3—3 of FIGURE 1; and

FIGURE 4 is a fragmentary detail axial sectional view through the valve mechanism, reaction member and associated parts, illustrating a modified form of the invention.

Referring to FIGURE 1, the numeral 10 designates a booster motor described in detail below and including a follow-up control valve mechanism operable by a push rod 11 connected to a conventional preferably depending pedal 12. Operation of the motor 10 displaces fluid from a master cylinder indicated as a whole by the numeral 13 to supply hydraulic fluid through lines 14 to conventional brake cylinders 15. As described below, the motor has been illustrated as being of the vacuum-suspended type and the motor is connected through a line 16 to a source of vacuum such as the intake manifold 17 of the vehicle engine, a check valve 18 being interposed in the line 16.

Referring to FIGURE 2, the motor comprises a main casing section 20 and an auxiliary casing section 21, and within the casing sections is arranged a pressure responsive unit described in detail below and indicated as a whole in FIGURE 2 by the numeral 22. This unit divides the motor to form a constant pressure chamber 23 to which the line 16 communicates, and a variable pressure chamber 24 to which the valve mechanism to be described admits atmospheric pressure to operate the pressure responsive unit 22.

The pressure responsive unit comprises an axial preferably cast body 28 to which is secured as at 29 a preferably cast cap member 30. A shell 31 is secured in any suitable manner at its inner periphery to the body 28 and is provided at its radially outer periphery with a cylindrical flange 32 over which is arranged a rolling diaphragm 33 having a bead 34 clamped between the peripheral portions of the casing sections 20 and 21. The diaphragm 33 is provided at its inner periphery with a bead 36 maintained in position by a plate 37 the inner periphery of which is arranged between adjacent portions of the body 28 and cap 30 and sealed with relation thereto by an O-ring 38. The plates 31 and 37 form therebetween a chamber 40 communicating with the chamber 23 through an opening 41 formed in the plate 31.

A valve supporting diaphragm 44 is clamped at its outer periphery between the body 28 and cap 30 and serves to support an annular resilient valve 45, this valve and associated elements now being conventional. This valve is normally spaced from, but engageable with, a valve seat 46 formed integral with the body 28. Outwardly of such seat, the body 28 is provided with a chamber 47 communicating through a passage 48 with the chamber 40.

An axial manually operable member 50 is connected in any suitable manner to the inner end of the rod 11 to be operated thereby. The member 50 is provided with a valve seat 51 normally engaging the valve 45 and such engagement is maintained by a spring 52 urging the valve 45 to the left in FIGURE 2 so that when the member 50 is moved to the left, such movement will be followed by the valve 45 to engage it with the seat 46. The cap 30 is provided with an axially projecting sleeve 53 slidable in a combined bearing and sealing unit 54, carried by the casing section 21 and sealed with respect to the rod 11 by a conventional boot 54'.

Between the body 28 and member 50 is formed a chamber 55, normally communicating with the chamber 47 and in fixed communication with the motor chamber 24 through a passage 56.

A flexible sealing diaphragm 60 is connected between the manually operable member 50 and the block 28, the outer periphery of the diaphragm 60 being sealed relative to the body 28 by a block 61 further described below. To the left of the diaphragm 60 is formed an atmospheric chamber 62 communicating through a port 63 with an axial chamber 64 formed in the member 50. This chamber, in turn, communicates with the space within the valve 45 through a port 65. The chamber 62 is in constant communication with the atmosphere through means to be described.

A guide member 70 is connected to the pressure responsive unit 22. The guide member 70 is provided at one end with a flange 71 held in position against the body 28 by a snap ring 72, the flange 71 serving to fix the block 61 in position. A return spring 74 is arranged between the snap ring 72 and the end wall of the casing section 20 to maintain the pressure responsive unit in its off position. Incidentally, such movement is limited and silenced by engagement of the diaphragm 33 with the end wall of the casing section 21.

The guide member 70 further comprises an axial tubular extension 76 terminating at its right-hand end in an annular portion 77 forming a shoulder for a purpose to be described. The member 70 is channeled as at 78 to afford communication between the chamber 62, through a passage 79, and the interior of the sleeve portion 76.

The sleeve portion 76 is slidable in a combined sealing and bearing unit 84 carried by the casing section 20 and is spaced from an adjusting nut 85 threaded on the end of a push rod 86 provided at its right-hand end in FIGURE 2 with an annular flange 87 engageable against the shoulder formed by the annular guide portion 77. A spring 88 is arranged between the nut 85 and an internal flange 89 formed in the sleeve portion 76 to bias the push rod 86 toward the left to its limit of movement as determined by engagement of the flange 87 with the shoulder with which it normally engages.

A rubber or similar resilient block 92 is arranged in a bore 93 formed in the block 61, the inner face of the flange 87 engaging throughout its area with the rubber block 92. The block 61 is provided with a wall 94 engaging the opposite face of the rubber block 92 and is provided with a series of circumferentially arranged openings 95 (FIGURE 3) in which are arranged small plungers 96 engaged against the adjacent annular end of the manually operable member 50. A spring 97 is arranged in the chamber 64 to bias the manually operable member 50 to its normal position shown in FIGURE 2, the left-hand end of the spring 97 surrounding an integral boss carried by the wall 94.

The left-hand end of the manually operable member 50 (FIGURE 2) is spaced from the wall 94 a distance greater than the normal spacing of the plungers 96 from the rubber block 92. The latter space, in turn, is slightly greater than the normal gap between the valve 45 and valve seat 46.

The master cylinder 13 (FIGURE 2) has an axial extension 100 projecting into the adjacent end of the casing section 20, and between such casing section and the master cylinder body is arranged an annular air cleaner 101 from which air flows through a passage 102 into the left-hand end of the sleeve portion 76, the interior of such sleeve portion therefore being in constant communication with the atmosphere.

The master cylinder is provided with the usual fluid displacing plunger 105 biased to off position into engagement with a snap ring 106 by a spring 107. For a reason which will become apparent, this spring, which is conventional, is weaker than the spring 88. The master cylinder and associated elements may be conventional and include the usual fluid replenishing reservoir 108.

The plungers 96 (FIGURE 3) are arranged in openings spaced circumferentially around the solid center of the wall 94. These openings are relatively close to each other for the ready deformation of the rubber of the block 92, as will become apparent. If desired, instead of the wall 94 having a solid center, it may be constructed as shown in FIGURE 4 with an axial opening 110 in which is arranged an axial plunger 111 engaged by a spring 112 corresponding to the spring 97. This provides a greater number of more closely arranged rubber deforming plungers.

*Operation*

The parts normally occupy the positions shown in FIGURE 2. Operation of the brake pedal 12 moves the rod 11 to the left in FIGURE 2, thus similarly moving the member 50 and its valve seat 51, this movement taking place against the loading of the light spring 97. The spring 52 causes the valve 45 to follow the seat 51 until the valve engages the seat 46, at which point the valve elements will be in lap position. This position is reached at, or slightly before, contact between plungers 96 and rubber block 92. Of course, the gaps at the ends of the plungers do not necessarily have to be at the rubber block ends thereof but may be between the plungers 96 and member 50.

In the lap position of the valves, the vacuum chamber 47, which is in constant communication with the motor chamber 23 through passage 48, chamber 40 and opening 41, will be cut off from the vacuum and slight further movement of the member 50 will crack the valve seat 51 from the valve 45, thus admitting atmospheric pressure through port 65 into the chamber 55 and thence through passage 56 into the chamber 24. Differential pressure will now move the pressure responsive unit 22 to the left.

It will be apparent that the block 61 is fixed with respect to the pressure responsive unit and that the left-hand face of the wall 94 engages the rubber block 92. Through such block the pressure responsive unit transmits force to the push rod 87 whereupon the adjusting nut 85 transmits movement to the master cylinder plunger 105. The spring 88, as indicated above, is stronger than the spring 107 so that initially resistance to movement of the master cylinder plunger 105 does not collapse the spring 88 to cause the flange 87 to deform the rubber body 92. During this initial operation of the motor, the plungers 96 will lightly deform the material of the body 92, thus providing a light first stage of reaction against initial movement of the brake pedal. At this time the resilient block 92 will be under extremely light internal compression, and force transmitted from the member 61 to the rod 86 through the member 92 is substantially less than the force transmitted from the sleeve 76 to the rod 86 through the spring 88. In this initial stage of operation, therefore, the spring 88 serves as the sole means for transmitting force from the pressure responsive unit to the master cylinder plunger 105.

Forces are transmitted to the master cylinder plunger 105 solely by the push rod 86 through the adjusting nut 87, there being no force directly transmitted by the sleeve portion 76 which serves, in conjunction with the sleeve 53, as a guide for the pressure responsive unit 22. The nut 85 is adjusted to lightly contact the end of the master cylinder plunger when the latter is in its off position shown in FIGURE 2.

Approximately at the point of initial engagement of the brake shoes with the drums, a substantial resistance to movement of the master cylinder plunger 105 will occur, and this resistance is sufficient to overcome the loading of the spring 88, whereupon the guide member 70 slightly overruns the push rod 86 causing slight relative sliding movement of the flange 87 to the right in FIGURE 2 relative to the bore 93 to place the rubber body 92 under compression. Whereas the soft rubber of this body was initially readily deformable because it was not under compression and because of the short distances between the plungers 96 which render deformation of the rubber easy, the rubber is now placed under compression and resists deformation by the plungers 96 to a substantially greater extent. This provides a second and relatively high degree of reaction against movement of the member 50 and consequently of the brake pedal.

The rubber body 92 is deformable but not compressible and, in later stages of brake operation, relatively great pedal forces may be delivered directly from the plungers 96 through the rubber body 92 to the push rod 86 to increase the total degree of application of the brakes. The left-hand end of the manually operable member 50 may be closely enough arranged to the wall 94 to engage solidly thereagainst for the direct transmission of pedal forces from the member 50 to the member 61 in later stages of brake operation. The loading of the spring 88 now being overcome, motor forces will be delivered to the rod 86, through engagement of the wall 94 with the flange 87. The ratio of the forces delivered by the plungers 96 and wall 94 to the plunger 86 will be the ratio of the areas of the plungers 96 and wall 94 engaging the member 92.

When the brake is released, the valve return spring 97 returns the member 50 to normal position whereupon the valve seats 46 and 51 are returned to their normal positions shown in FIGURE 2. Thus the motor chamber 24 is cut off from the atmosphere and the pressure responsive unit 22 will be pressure-balanced through communication of the chamber 24 with the chamber 23 to vacuum-suspend the pressure responsive unit 22.

It is an important feature of the present invention that pedal forces are delivered to the rubber body 92 through spaced plungers 96 which are movable independently of the member 50 as distinguished from prior constructions wherein such forces have been delivered directly from the pedal to the deformable member. The independent mounting of the plungers 96 makes it unnecessary that the parts be held concentric. Moreover, the easy deformation of the rubber body 92 in initial stages of motor operation, in which the member 92 is not under compression, takes place relatively easily because of the limited areas of the plungers 96 and the relatively close spacing thereof which limits the distance through which the rubber must flow to be deformed. Accordingly, very sensitive pedal reaction occurs during initial stages of motor operation.

It is a further important feature of the present invention that the deformability of the rubber body 92 is altered during motor operation by placing the rubber body under compression which occurs when the loading of the spring 88 is overcome so that the flange 87 moves tightly against the body 92 to place it under compression. A further important feature of the invention lies in the provision of the spring 88 which forms means for initially resisting axial movement of the push rod 86 relative to the pressure responsive unit 22 to predetermine the point at which the reaction element 92 functions to provide its second and higher stage of reaction. There is a direct relationship between the loading of the springs 88 and 107, the spring 88 serving as the sole means for preventing initial relative reaction movement of the rod 86 so as to render this rod effective for moving the piston 105 against the loading of the master cylinder spring 107.

The form of the invention shown in FIGURE 4 is advantageous for the reason that it not only places the circumferentially arranged plungers 96 relatively close to each other (FIGURE 3) but also relatively close to an axial plunger 111 thus rendering all of the plungers more easily initially operable for deforming the rubber body 92.

The various features of the invention referred to above cooperate to provide a particularly smoothly operating vacuum motor wherein the control valve mechanism is more sensitive so that it produces a better follow-up of the power relative to the manual force exerted by the operator. The relationship between the loading of the springs 88 and 107 is important for the reason that it insures that the brake shoes are expanded to contact the drum before any substantial reaction is transmitted to the brake pedal.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A fluid pressure motor mechanism comprising a casing, a pressure responsive unit forming therewith a variable pressure chamber, a valve mechanism, comprising a manually operable member, movable upon initial movement of said manually operable member from a normal off position to connect said variable pressure chamber to a source of pressure to operate said pressure responsive unit, a push rod projecting from said pressure responsive unit and forming a member to be operated, a spring surrounding said rod and engaging at opposite ends against said rod and said pressure responsive unit and forming means for transmitting forces from said pressure responsive unit to said rod when resistance to movement of said rod is below a predetermined point, said spring being yieldable when said resistance increases above said predetermined point, said rod being axially movable relative to said pressure responsive unit, and a deformable body engaging at one side against said push rod and at its opposite side against said manually operable member and said pressure responsive unit for the transmission of forces from said unit and said manually operable member to said push rod independently of said spring when said spring yields when resistance to movement of said rod increases above said predetermined point.

2. A mechanism according to claim 1 wherein said manually operable member is coaxial with said rod, and a plurality of plungers having their axes circumferentially spaced around the axis of and engageable with said manually operable member and movable into engagement with said deformable body.

3. A mechanism according to claim 1 wherein said pressure responsive unit is provided with an axial recess opening toward said push rod and provided at its inner end with a wall provided with cylindrical openings having their centers circumferentially spaced around the axis of said manually operable member, said push rod having a flange corresponding in shape and size to and slidable in the open end of said recess, a deformable block in said recess between said wall and said flange, and plungers slidable in said openings and engaging at one end against said manually operable member to be moved thereby into engagement with said deformable body.

4. A fluid pressure motor mechanism comprising a casing, a pressure responsive unit forming therewith a variable pressure chamber, a valve mechanism, comprising a manually operable member, movable upon initial movement of said manually operable member from a normal off position to connect said variable pressure chamber to a source of pressure to operate said pressure responsive unit, a push rod projecting from said pressure responsive unit and forming a member to be operated, said pressure responsive unit having a cylindrical sleeve surrounding and coaxial with said rod and provided with an internal shoulder, a compression spring surrounding said rod and engaging at one end against said shoulder and at its other end against said rod and forming means for transmitting forces from said pressure responsive unit to said rod when differential pressures affecting said pressure responsive unit are below a predetermined point, said spring being yieldable when said differential pressure increases incident to resistance above a predetermined point to movement of said rod, and means for connecting said rod to said pressure responsive unit and to said manually operable member independently of said spring for the transmission of forces from such unit and said manually operable member to said rod when said spring yields incident to resistance to movement of said rod.

5. A fluid pressure motor mechanism comprising a casing, a pressure responsive unit connected thereto and forming therewith a variable pressure chamber, a valve mechanism in said pressure responsive unit movable axially therein to connect said variable pressure chamber to a source of pressure, said pressure responsive unit comprising an axial body having an axial recess, a push rod having a portion fitting and slidable in said recess, said body having a wall spaced from said portion of said member to be operated, a deformable body arranged in said recess between said wall and said member to be operated, a portion of said wall being in direct contact with said deformable body to deliver force therethrough to said member to be operated when said motor is energized, and means for delivering forces from said manually operable member to said deformable body over a plurality of spaced relatively small areas.

6. A fluid pressure motor mechanism comprising a casing, a pressure responsive unit connected thereto and forming therewith a variable pressure chamber, a valve mechanism in said pressure responsive unit movable axially therein to connect said variable pressure chamber to a source of pressure, said pressure responsive unit comprising an axial body having an axial recess, a push rod having a portion fitting and slidable in said recess, said body having a wall spaced from said portion of said member to be operated, a deformable body arranged in said recess between said wall and said member to be operated, a portion of said wall being in direct contact with said deformable body to deliver force therethrough to said member to be operated when said motor is energized, said wall being provided with a plurality of spaced openings, and plungers slidable in said openings and engageable at opposite ends against said manually operable member and said deformable member.

7. A fluid pressure motor mechanism comprising a casing, a pressure responsive unit connected thereto and forming therewith a variable pressure chamber, a valve mechanism in said pressure responsive unit movable axially therein to connect said variable pressure chamber to a source of pressure, said pressure responsive unit comprising an axial body having an axial recess, a push rod having a portion fitting and slidable in said recess, said body having a wall spaced from said portion of said member to be operated, a deformable body arranged in said recess between said wall and said member to be operated, a portion of said wall being in direct contact with said deformable body to deliver force therethrough to said member to be operated when said motor is energized, said wall being provided with a plurality of spaced openings, plungers slidable in said openings and engageable at opposite ends against said manually operable member and said deformable body, said wall being provided with an axial opening, one of said plungers being arranged in said axial opening, and a return spring for said manually operable member arranged between such member and said last-named plunger.

8. A fluid pressure motor mechanism comprising a casing, a pressure responsive unit carried by said casing and forming therewith a variable pressure chamber, said pressure responsive unit having an axial body, a valve mechanism mounted in said body and axially movable to connect said variable pressure chamber to a source of pressure, a member to be operated projecting axially from said pressure responsive unit, said body having an axial recess opening toward said member to be operated and provided with an inner wall, said member to be operated having an inner end portion fitting and slidable in said recess, a deformable body arranged in said recess between said wall and said portion of said member to be operated, a portion of said wall engaging said deformable body to transmit forces therethrough to said member to be operated, means movable with said valve mechanism and engageable through said wall with said deformable body to transmit forces thereto and to transmit reactions therefrom to said valve mechanism upon deformation of said deformable body incident to the transmission of forces thereto, and means for delaying the transmission of reaction forces to said valve mechanism until resistance to movement of said member to be operated increases above a predetermined point.

9. A fluid pressure motor mechanism comprising a casing, a pressure responsive unit carried by said casing and forming therewith a variable pressure chamber, said pressure responsive unit having an axial body, a valve mechanism mounted in said body and axially movable to connect said variable pressure chamber to a source of pressure, a member to be operated projecting axially from said pressure responsive unit, said body having an axial recess opening toward said member to be operated and provided with an inner wall, said member to be operated having an inner end portion fitting and slidable in said recess, a deformable body arranged in said recess between said wall and said portion of said member to be operated, a portion of said wall engaging said deformable body to transmit forces therethrough to said member to be operated, means movable with said valve mechanism and engageable through said wall with said deformable body to transmit forces thereto and to transmit reactions therefrom to said valve mechanism upon deformation of said deformable body incident to the transmission of forces thereto, and means connected between said pressure responsive unit and said member to be operated for reducing the deformability of said deformable body to increase reactions transmitted to said valve mechanism when resistance to movement of said member to be operated increases above a predetermined point.

10. A fluid pressure motor mechanism comprising a casing, a pressure responsive unit carried by said casing and forming therewith a variable pressure chamber, said pressure responsive unit having an axial body, a valve mechanism mounted in said body and axially movable to connect said variable pressure chamber to a source of pressure, a member to be operated projecting axially from said pressure responsive unit, said body having an axial recess opening toward said member to be operated and provided with an inner wall, said member to be operated having an inner end portion fitting and slidable in said recess, a deformable body arranged in said recess between said wall and said portion of said member to be operated, means limiting movement of said portion of said member to be operated away from said deformable body, a spring engageable at opposite ends with said pressure responsive unit and said member to be operated to urge said portion of said member to be operated away from said deformable body, a portion of said wall engaging said deformable body to transmit forces therethrough to said member to be operated, and means movable with said valve mechanism and engageable through said wall with said deformable body to transmit forces thereto and to receive reaction therefrom upon deformation of said deformable body incident to the transmission of forces thereto, said spring being yieldable when resistance to movement of said member to be operated increases above a predetermined point whereby said portion of said member to be operated moves against said deformable body to reduce the deformability thereof and increase the reaction transmitted to said valve mechanism.

References Cited in the file of this patent
UNITED STATES PATENTS

| | | |
|---|---|---|
| 2,006,487 | Sorensen | July 2, 1935 |
| 2,857,743 | Price | Oct. 28, 1958 |
| 2,862,365 | Ingres et al. | Dec. 2, 1958 |
| 2,894,490 | Ingres | July 14, 1959 |
| 2,985,143 | Stelzer | May 23, 1961 |
| 3,009,448 | Price | Nov. 21, 1961 |